Feb. 4, 1958  R. WINFIELD  2,822,514
TIME SELECTIVE METER CIRCUIT

Filed June 14, 1954  4 Sheets-Sheet 1

INVENTOR
RAYMOND WINFIELD
BY George Sipkin
Lee J. Huntzberger
ATTORNEYS

Feb. 4, 1958

R. WINFIELD 2,822,514

TIME SELECTIVE METER CIRCUIT

Filed June 14, 1954

INVENTOR
RAYMOND WINFIELD
BY George Sipkin
Lee J. Kintzberger
ATTORNEYS

2,822,514
TIME SELECTIVE METER CIRCUIT

Raymond Winfield, New York, N. Y.

Application June 14, 1954, Serial No. 436,750

9 Claims. (Cl. 324—20)

(Granted under Title 35, U. S. Code (1952), sec. 266)

The invention described herein may be manufactured and used by or for the Government of the United States of America for governmental purposes without the payment of any royalties thereon or therefor.

This invention relates to a time-selective meter circuit and more particularly to a time-selective meter circuit for ascertaining the magnitude of a changing physical phenomenon where the physical phenomenon starts at a known time and changes under known conditions; the magnitude of the physical phenomenon is ascertained by the meter circuit substantially instantaneously at the end of a preselected time interval following the initiation of the change; the magnitude is ascertained while the magnitude of the physical phenomenon is changing.

More particularly, this invention relates to a time-selective meter circuit for ascertaining the magnitude of any physical phenomenon, as for example, heat, light, sound, force, and pressure. The meter circuit is operable for making measurements during a transient period or during a steady state period. The magnitude of the physical phenomenon is caused to change under known conditions; the meter circuit ascertains the magnitude of the physical phenomenon after the lapse of a selected-time interval following initiation of the change. For example, assuming the application where a cathode ray tube screen is continuously excited for a long enough period so that its fluorescent light intensity is constant and then the screen excitation is cut off. This invention can ascertain accurately the instantaneous phosphorescent light intensity at the end of any predetermined time interval following excitation cutoff. In another application the instantaneous fluorescent light intensity of a cathode ray tube is ascertained accurately at a selected instant following the initiation of screen excitation. In general, this invention is adapted to be used for ascertaining accurately the instantaneous magnitude of a physical phenomenon wherever it is possible to change the physical phenomenon into a proportional voltage or current and where the controlling condition (e. g. excitation of the screen of a cathode ray tube) can be initiated or terminated instantaneously, or in a known way.

In the prior art, where investigating voltage or current waveforms, either transient or continuous, it is necessary to record each waveform for quantitative measurements. Mechanical recorders may be satisfactory for this purpose but only under conditions where relatively low frequency variations are involved; even then it is necessary to use high chart speeds to obtain good accuracy. Where waveforms are obtained from oscillographic displays, photographs must be taken; an immediate disadvantage of this method is that the procedure used for accurate screen calibration is cumbersome and tedious. The later is especially true if a wide range of amplitudes is encountered.

This invention marks a departure from the prior art in that it provides a direct reading time-selective meter circuit that performs two functions synchronously; first it controls the initiation of change in a controlling condition (e. g. energization or deenergization), and at the same instant initiates the operation of a time-delay device for controlling a gating means which permits an information-storage-indicator to measure the magnitude of the physical phenomenon for a substantially instantaneous period of time at the end of the selected-time interval following initiation of change in controlling conditions.

An object of this invention is to provide a time-selective meter circuit.

A further object is to provide a time-selective meter circuit for ascertaining the magnitude of the physical phenomenon at a selected instant during a transient or steady state period.

A further object is to provide a time-selective meter circuit for ascertaining the magnitude of a physical phenomenon at a selected instant during a transient or steady state period and for storing the information for a period of time sufficient to permit a reading to be carefully taken and recorded by test personnel.

A further object is to provide a time-selective meter circuit for measuring the magnitude of a physical phenomenon at a selected instant during a transient period and over a time interval which is so short that a negligible percentage change is encountered in the magnitude of the physical phenomenon during the short time interval of measurement and for storing the measurement for a period of time sufficient to permit a reading to be carefully taken and recorded by test personnel.

A further object is to provide a time-selective meter circuit for use in measuring the magnitude of a physical phenomenon at a known instant in time wherever the physical phenomenon may be transduced into a proportional current or voltage.

A further object is to provide a time-selective meter circuit for measuring the magnitude of a physical phenomenon at a selected instant under conditions where the physical phenomenon starts from a known or unknown magnitude and is caused to change under known conditions to the magnitude measured by the meter at the end of a known time interval following initiation of the change.

A further object is to provide a time-selective meter circuit for making measurements of cathode ray tube screen characteristics.

A further object is to provide a time-selective meter circuit for use in cathode ray tube screen persistence measurements.

A further object is to provide a time-selective meter circuit for use in cathode ray tube screen phosphorescent decay measurements.

A further object is to provide a time-selective meter circuit for use in cathode ray tube screen build-up characteristics.

A further object is to provide a time-selective meter circuit for use in measuring the instantaneous magnitude of cathode ray tube light intensity output at the end of a predetermined interval of time during which the light intensity output is changing under known conditions from a constant magnitude at the initiation of change.

Other objects and many of the attendant advantages of this invention will be readily appreciated as the same becomes better understood by reference to the following detailed description when considered in connection with the accompanying drawings wherein:

In the subsequent description of a preferred embodiment of this invention, quantitative information on the components has been included immediately following the description of most elements. It is not intended that the quantitative description be interpreted in a limiting sense. The quantitative information is for one particular design of the embodiment shown; this embodiment has been used satisfactorily and successfully under actual operation conditions. A source of reference potential is indicated by the conventional grounding symbols on the drawings and is referred to throughout this description as ground. Where electronic tubes are shown in the drawings, the heater filaments have been omitted to simplify the drawings. The power supply, not shown, for the heater filaments, not shown, is conventional and is obtainable from electronic circuit designers' handbooks.

Figure 1:
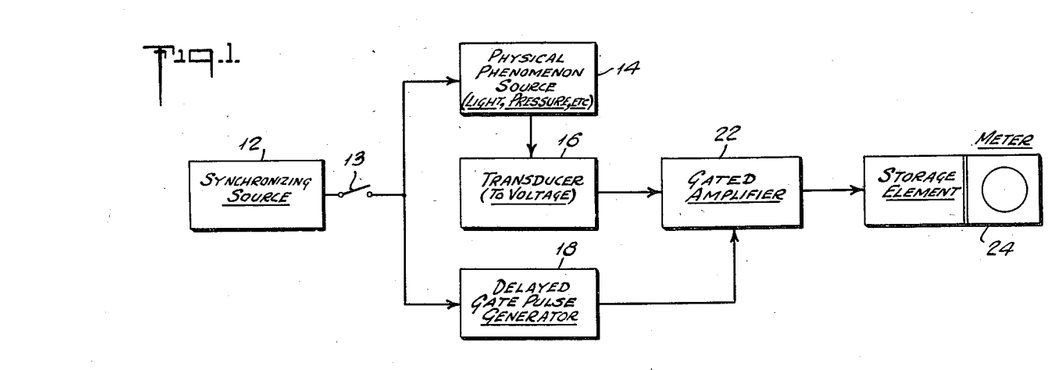
Fig. 1 is a block diagram of this invention in its broader aspects.

In its broader aspects the invention includes a synchronizing source 12 (Fig. 1). The synchronizing source 12 is adapted to be simultaneously connected to a physical phenomenon source 14 and to a variable delayed gate pulse generator 18 through a switch 13. The output of the physical phenomenon source 14 whether it be light, pressure, sound, or other physical phenomena, is fed into a transducer 16 which converts the physical phenomenon into a proportional voltage. A proportional voltage from transducer 16 is fed directly into a gated amplifier 22. The gated amplifier 22 produces no output unless permitted to do so by the variable delayed gate pulse generator 18. When the gated amplifier 22 does produce an output, the output is fed into the storage element and indicator 24. When the switch 13 is closed, variable delayed-gate pulse generator 18 is responsive only to the instantaneous initial output from the synchronizing source 12 to provide a gating pulse after a measured time interval. When the variable delayed-gate generator 18 provides a gating pulse for the gated amplifier 22, the latter is permitted to provide an output to the storage element and indicator for the interval of the gating pulse; the gating pulse interval is extremely short. Coincident with the triggering of the variable delayed-gate generator 18, the physical phenomenon source 14 is caused to produce an output whose magnitude varies with time. The output of the physical phenomenon source 14 is continuously fed into the transducer 16 for generating a continuously proportional voltage to the gated amplifier 22. By this arrangement, a reading of the instantaneous magnitude of the output of the physical phenomenon source is obtained at a selected instant following the initiation of the physical phenomenon source output by the synchronizing source 12.

Figure 2:
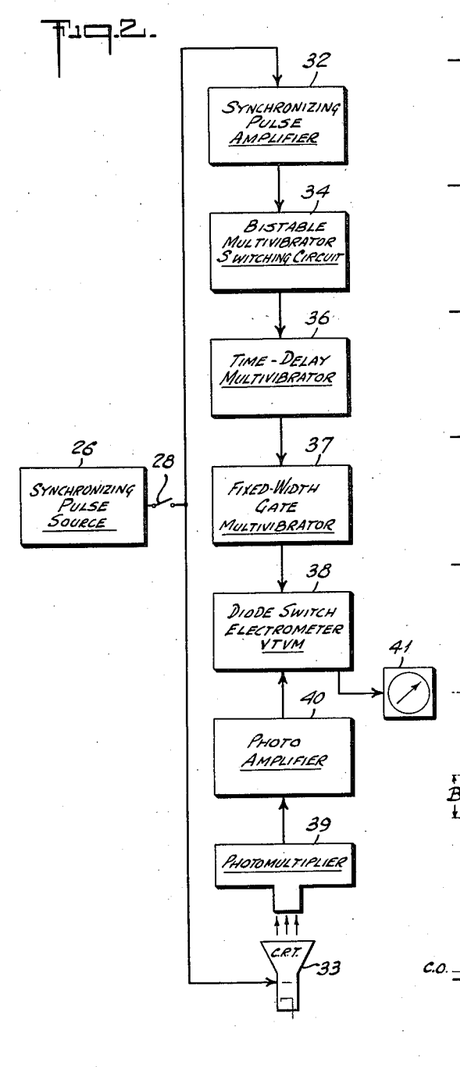
Fig. 2 is a block diagram of a more specific embodiment of this invention in accordance with the block diagram shown in Fig. 1.
Figure 3:
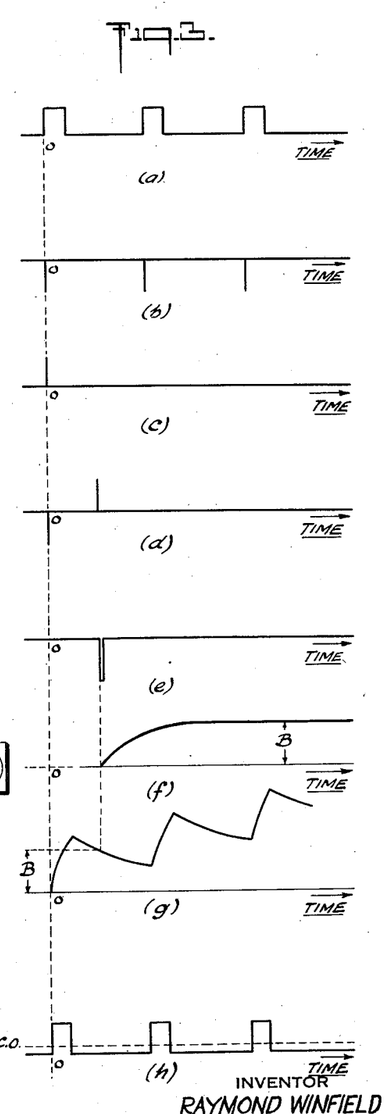
Fig. 3 is a series of graphical plots of the action occurring synchronously in each of the blocks of Fig. 2, Figs. 4 and 5 comprise two portions of a composite circuit wiring diagram of the invention shown in Fig. 2 with parts shown in block form.

A block diagram of the embodiment of the invention subsequently described in detail, is shown in Fig. 2. The invention as shown in the block diagram of Fig. 2 includes a synchronizing source 26 connected in circuit with a switch 28 for controlling the action of the circuit. The output of the synchronizing source 26 is synchronously fed into the synchronizing pulse amplifier 32 and the control grid of the cathode ray tube 33. The output waveform of the synchronizing pulse source is shown in Fig. 3a and Fig. 3h. This synchronizing amplifier 32 provides a negative pulse output to a bistable multivibrator switching circuit 34. The bistable multivibrator switching circuit 34 serves the purpose of passing only the first of the negative voltage pulses derived from the synchronizing pulse amplifier 32. The single negative voltage pulse derived from the synchronizing pulse amplifier produces a single positive voltage pulse at the output of the bistable multivibrator switching circuit 34 which is generated synchronously with the leading edge of the first pulse derived from the synchronizing pulse source 26, as shown in Fig. 3c. The single positive voltage pulse is used to trigger a time-delay multivibrator 36; time-delay multivibrator 36 generates a differentiated output in the form of a negative voltage pulse synchronous with the leading edge of the first pulse from source 26 followed by delayed positive voltage pulse whose time separation from the first pulse is selected by the operator and equals the time at which a measurement is desired. The delayed positive voltage pulse from the time-delay multivibrator 36 is used to trigger a fixed-width gate multivibrator 37. The output of the fixed-width gate multivibrator 37 is in the form of a very narrow gate pulse for operating a diode switch electrometer vacuum tube voltmeter 38. Coincident with the triggering of the time-delay multivibrator 36, pulsing of the cathode ray tube 33 is begun by the synchronizing pulse source 26. The resultant light intensity from the screen of the cathode ray tube 33 is monitored by a photomultiplier 39, the output of which is fed into a photoamplifier 40. The output of photoamplifier 40 is permitted to be fed into the meter 41 by the diode switch during the width of the gating pulse output from the fixed-width gate multivibrator 37 as indicated in Fig. 3(e), Fig. 3(f), and Fig. 3(g). Fig. 3(g) shows the buildup characteristics of a cathode ray tube screen under periodic pulse excitation. The width of each exciting pulse is equal to the time for one complete raster to be scanned on the cathode ray tube screen. Meter 41 of the time-selective meter stores and records the magnitude of the light intensity at the cathode ray tube screen at the instant shown in Fig. 3(g) during the phosphorescent decay of the cathode ray tube screen. The time-delay introduced by the time-delay multivibrator 36 is variable so that the measurement may be made at the instant desired. It is important in this invention that the width of the gating pulse derived from the fixed width gate multivibrator be so narrow that during the interval of the gating pulse there is negligible percentage change in the light intensity output of the cathode ray tube screen. This general arrangement may be adapted to measuring other physical phenomena as described above without departing from the spirit of the invention. Primarily it would be necessary to change the photomultiplier 39 for a transducer appropriate to the circumstances.

The circuit shown and described in detail is for use with a cathode ray tube 42, operating as a physical phenomenon source. The deflection circuitry for the cathode ray tube is not shown since it is not relevant to the invention. A photomultiplier 44 operating as a transducer is mounted adjacent the cathode ray tube 44 in a light-tight enclosure 46.

The circuit includes a pair of conventional direct current regulated power supplies 52 (300 volts) and 54 (500 volts), and a synchronizing pulse source 55 of conventional design for generating a rectangular waveform with each pulse occupying a fraction of a cycle (one cycle per second with a pulse width of 1/60 second).

A limiter-amplifier 56 is connected to the power supply 52 and to synchronizing pulse source 55. A switch 57 is provided between the synchronizing pulse source 55, and the limiter-amplifier 56 and also the control grid of cathode ray tube 42. The beam of the cathode ray tube is turned on for the duration of each pulse from source 55. The limiter-amplifier 56 includes a cathode follower having a vacuum triode 58 (½ 5963). The plate of the vacuum triode 58 is connected to power supply 52. The cathode of triode 58 is connected to one end of cathode resistor 62; the other end of the cathode resistor 62 is connected to ground. The pulses from the synchronizing pulse source 55 are coupled through a coupling condenser 64 (.5 mfd.) and are developed across the resistance portion (.25 megohm) of the potentiometer 66. The free end of the resistance of the potentiometer 66 is connected to ground. Tap 68 of the potentiometer 66 is connected directly to the control grid of the vacuum triode 58. The time constant of the circuit branch including condenser 64 and the resistance portion of potentiometer 66 is much longer than the period of the pulses applied so that each pulse is substantially entirely developed across resistance 66. Because the synchronizing pulse input to the limiter-amplifier 56 is obtained from the source as is the grid drive voltage of cathode ray tube 42, the amplitude of the pulses are changed in accordance with the type of cathode ray tube to provide proper beam current; the potentiometer 66 is used to vary the voltage input to triode 58 to compensate for the change made in accordance with cathode ray tube type at 42. The cathode ray tube grid-driving signal which is derived from the synchronizing pulse source 55 is adjusted in amplitude until the desired beam current is obtained in the cathode ray tube. This is accomplished by adjusting the pulse amplitude in the steady state direct-current condition for the prescribed test beam condition. The potentiometer 66 is adjusted to a high enough level to allow stable performance and triggering of the subsequent circuits for most cathode ray tube types encountered and is readjusted when necessary. The limiter-amplifier 56 includes voltage amplifier having a vacuum triode 72 (½ 5963), a plate-load resistor 74 (20 kilohms), a cathode bias resistor 76 (15 kilohms), and a bypass condenser 82 (4 mfd.) connected across the cathode bias resistor. The purpose of the amplifier stage 72 is to build up the voltage developed across cathode bias resistor 62 and also to shorten the rise time of the voltage developed across cathode resistor 62. The triode 72 is biased beyond cutoff. This is accomplished by means of a voltage divider including cathode bias resistor 76 and resistor 78 (.2 megohm) connected across the power supply 52. The control grid of triode 72 is normally at ground potential because there is no current flow through grid resistor 84 (.1 megohm). The grid-cathode potential of triode 72 is raised above cutoff when a positive pulse is coupled into the limiter-amplifier 56 from the synchronizing pulse source 55 (Fig. 3(a)). The voltage developed across the resistor 62 is differentiated by the coupling condenser 85 (.001 mfd.) in series with the resistor 84 (.1 megohm) and the resistor 86 (.1 megohm). Only the positive spike corresponding to the leading edge is utilized. When the voltage across resistor 62 does not exceed a predetermined positive level, resistors 84 and 86 simply function as a voltage divider; if the voltage is greater than that, the resistor 86 serves as an attenuator in combination with a clamper diode 88 (both halves of a 6AL5 connected in parallel). The cathode of the clamper diode 88 is biased through the use of a voltage divider including resistor 92 (75 kilohms) in series with resistor 94 (5 kilohms) connected directly between the power supply 52 and ground. The clamper diode 88 in series with resistor 94 offers a low impedance path to ground in shunt across grid-leak resistor 84 when the voltage (about 20 volts) at the grid of triode 72 exceeds the bias of clamper diode 88.

A check point in the form of a jack J1 is provided to check whether the proper trigger pulsed output is being obtained from the synchronizing pulse source 55. It is important that the leading edge of the synchronizing voltage waveform be very steep and the grid drive signal of the cathode ray tube have a rectangular waveform to obtain proper beam current.

Only the first of the series of amplified voltage spikes developed across plate-load resistor 74 serve to trigger bistable multivibrator switching circuit 128 and hence, in normal operation, only one pulse will pass through for each measurement. The succeeding voltage spikes have no effect. The plate-load resistor 74 couples limiter-amplifier 56 and bistable multivibrator switching circuit 128. There is developed at the plate of the triode 132 a steep negative pulse with negligible rise time for triggering the bistable multivibrator switching circuit. It is important that the pulse be very steep since the leading edge of this pulse defines zero reference time from which all time in the subsequent circuits is measured or related.

The bistable switching circuit 128 includes a vacuum triode 132 (½ 5963) and a vacuum triode 134 (½ 5963). Plate-load resistor 74 for vacuum triode 74 is also in plate circuit of vacuum triode 72 of limiter-amplifier 56. Plate-load resistor 136 (20 kilohms) is connected in circuit with the vacuum triode 134. Control grid bias for the vacuum triode 132 is obtained by means of a voltage divider network connected between power supply 52 and ground and including plate-load resistor 136 (20 kilohms), resistor 138 (.2 megohms), resistor 142 (.1 megohm), and resistor 144 (.1 megohm). The control grid of the vacuum triode 132 is connected to the junction between the resistors 138 and 142. A normally-open push-button switch 146 is connected in shunt across the resistor 144. The control grid bias for the vacuum triode 134 is obtained from a substantially identical voltage divider network connected between power supply 52 and ground and includes the plate-load resistor 74, resistor 148 (.2 megohm), and resistor 152 (.2 megohm). The control grid of the vacuum triode 134 is connected to the junction between the resistor 148 and the resistor 152. The only difference between the two voltage divider networks is that half the resistance between control grid of the triode 132 and ground is adapted to be bypassed by switch 146 to reduce the positive potential on the control grid of the vacuum triode 132. The cathodes of both triodes 132 and 134 are returned to ground by means of a cathode bias resistor 159 (40 kilohms), shunted by a bypass condenser 156 (4 mfd.). Bypass condensers 139 and 149 (50 mmfd. each) are connected in shunt across resistors 138 and 148, respectively. A single-pole sinlge-throw switch 158 is connected in series between the cathode of the vacuum triode 132 and the cathode bias resistor 154. When the switch 158 is in open position, the bistable multivibrator switching circuit is operative as an amplifier of all the negative voltage spikes from limiter-amplifier 56; vacuum triode 132 is completely out of the circuit. When the switch 158 is closed, switching circuit 128 acts as a bistable multivibrator having two stable operating conditions; one condition occurs when the vacuum triode 132 is conducting and the vacuum triode 134 is nonconducting and the other condition occurs when the vacuum triode 132 is nonconducting and the vacuum triode 134 is conducting. The vacuum triode 134 is caused to become conducting when it is not conducting by depressing the operating button of the push-button switch 146. This results in a momentary reduction of the positive control grid bias of the vacuum triode 132. As a result, the plate current of the vacuum triode 132 is reduced causing a positive-going voltage pulse to be coupled into the control grid of the vacuum triode 134 through the condenser 149. The condenser 149 and grid-leak resistor 152 causes a substantially instantaneous changeover. The vacuum triode 134 becomes fully conducting while the vacuum triode 132 becomes nonconducting. This condition remains because the positive cathode bias potential developed across the cathode bias resistor 154 by the plate current of the vacuum triode 134 taken relative to the control grid potential of vacuum triode 132 results in vacuum triode 132 being biased beyond cutoff. When current again flows through the plate-load resistor 74 to cause a negative pulse to be coupled into the control grid of the vacuum triode 134, the circuit 128 flops over to its other stable state. The latter occurs when the vacuum triode 74 of the limiter-amplifier 56 conducts coincident with a positive input pulse synchronizing pulse source 55. Any additional pulses appearing at the input of the bistable multivibrator switch have no effect on the circuit until it is reset by reset switch 146.

A positive step in the plate potential of vacuum triode 134 due to the reduction of plate current is differentiated by means of a condenser 162 (50 mmfd.) connected in series with a resistor 164 (1 megohm). The resistor 164 is shunted by a rectifier 166 (IN34) to permit only positive potential pulses to be developed at the input end of a time-delay multivibrator circuit 172. The multivibrator circuit 172 is a monostable circuit. Multivibrator 172 includes a vacuum triode 174 (½ 5963) and a vacuum triode 176 (½ 5963). A common cathode bias resistor 178 (3 kilohms) is connected between ground and the cathodes of both the triodes 174 and 176. A plate-load resistor 182 (50 kilohms) is connected between vacuum triode 174 and power supply 52. A plate-load resistor 184 (15 kilohms) is connected between the vacuum triode 176 and the power supply 52.

Ordinarily, the control grid of the vacuum triode 174 is at ground potential, and the vacuum triode 174 is cut off by the cathode bias developed by the plate current of the vacuum triode 176 flowing through the cathode bias resistor 178. The vacuum triode 176 is normally conducting because its control grid is connected to the positive terminal of power supply 54 (500 volts) through any selected one of a plurality of resistance paths between the control grid of the vacuum triode 176 and the power supply 54 under the control of a double-pole-double-throw switch 186. When a positive voltage pulse is applied to the control grid of a vacuum triode 174 the latter conducts causing the vacuum triode 176 to become cut off due to the negative voltage step at the plate of the vacuum triode 174; the negative voltage step is coupled into the grid circuit of the vacuum triode 176 by means of one of the condensers 188 (1 mfd.), 192 (.25 mfd.), or 194, and the two vacuum triodes 174 and 176 change states in normal multivibrator action. The length of time during which the vacuum triode 176 remains cut off after the application of a positive voltage pulse to the control grid of the vacuum triode 174 depends upon the time constant of its control grid input circuit. A time-delay may be selected from among six time constants by means of the two pole six-position switch 186. At each position of the switch 186 a resistor-condenser combination having a different time constant is selected for connection in circuit with the control grid of the vacuum triode 176. The six resistance branches include a first branch having a fixed resistor 202 in series with a variable resistor 204 (5 megohms), a second branch having a fixed resistor 206 (3 megohms) in series with a variable resistor 208 (1 megohm), a third branch having a fixed resistor 212 (7 megohms) in series with a variable resistor 214 (3 megohms), a fourth branch having a fixed resistor 216 (6 megohms) in series with a variable resistor 218 (1 megohm), a fifth branch having a fixed resistor 222 (30 megohms) in series with a variable resistor 324 (5 megohms), a sixth branch having a fixed resistor 226 (67 megohms). Assuming that the switch 186 in the time-delay multivibrator circuit 172 is in the position shown and assuming that no positive pulse is coupled into the control grid of the vacuum triode 174, the vacuum triode 174 is cut off. Under that condition, the condenser 192 is charged to the difference in potential between the power supplies 52 and 54. When a positive pulse is applied to the control grid of the vacuum triode 174, it becomes conducting, causing a drop in potential at the plate of the vacuum triode 174. Since the drop in potential cannot instantaneously appear across the condenser 192 it is developed across the fixed resistor 206 in series with the variable resistor 208. This negative voltage pulse is applied directly to the control grid of the vacuum triode 176 whereby the vacuum triode 176 which was previously conducting is now cut off. The action is practically instantaneous. The vacuum triode 176 remains cut off until the condenser 192 charges sufficiently to cause the grid-cathode potential of the vacuum triode 176 to rise above cutoff. At that time, the vacuum triode 176 begins to conduct and the vacuum triode 174 is again cut off. The variable resistors in each of the resistance branches for the six positions of the switch 186 allow for adjustment of the time constant so that the time-delay may be accurately selected within the range afforded by each of the resistance branches. The resistance of each of the resistance branches is high enough to prevent any damaging grid current flow in the vacuum triode 176.

The bistable multivibrator switching circuit 128 functions as a multivibrator only when the switch 158 is closed. When the switch 158 is open the triode 134 functions as an amplifier only. In the latter case, the pulses are amplified and inverted in the stage 134. This series of amplified pulses are for application to the time-delay multivibrator for constant triggering during calibration of the circuit. The jack J2 is provided as a check point to monitor the pulse width of the time-delay multivibrator when the switch 58 is in repetitive position. Calibration of the time-delay multivibrator for introducing particular time delays is accomplished by adjusting the setting of the variable resistors 204, 208, etc.

The negative voltage pulse at the plate of the vacuum triode 174 is coupled through a coupling condenser 228 (100 mmfd.) into a fixed-width gate multivibrator 232. The multivibrator 232 is also a cathode-coupled monostable multivibrator. The fixed bias on the normally cut-off vacuum triode 234 is adjustable for varying the width of the output or gating voltage pulse. The multivibrator 232 includes a vacuum triode 234 (½ 5963) and a vacuum triode 236 (½ 5963). A common cathode bias resistor 238 (10 kilohms) is connected between ground and the cathodes of both vacuum triodes 234 and 236. A plate-load resistor 242 (5600 ohms) is connected between the power supply 52 and triode 234. A plate-load resistor 244 (15 kilohms) is connected between the power supply 52 and the plate of the vacuum triode 236. A grid resistor 246 (12 megohms) is connected between power supply 52 and the control grid of the vacuum triode 236. The plate of the vacuum triode 234 is coupled to the control grid of the vacuum triode 236 by a coupling condenser 248 (.002 mfd.). A voltage divider including a fixed resistor 252 (.1 megohm) in series with the resistance portion of a potentiometer 254 (25 kilohms) is connected between power supply 52 and ground. A grid resistor 256 (1 megohm) is connected between the control grid of vacuum triode 254 and the tap 255 of the potentiometer 254. The control grid bias of the vacuum triode 254 is adjusted with the potentiometer tap 255. The vacuum triode 236 is normally conducting and the vacuum triode 234 is normally cut off. This is due to the fact that the control grid of the vacuum triode 236 is connected to power supply 52 through resistor 246 so that it is normally fully conducting. The current in the cathode bias resistor 238 is sufficient to normally cut off triode 234. The triode 234 conducts only when there is an incident positive pulse of sufficient magnitude to initiate multivibrator switching action. A positive voltage spike is applied to the control grid of the vacuum triode 234 coincident with the trailing edge of the negative voltage pulse developed at the plate of the vacuum triode 174 in time-delay multivibrator 172. The negative voltage pulse at the plate of triode 174 is differentiated by the coupling condenser 228 (100 mmfd.) in series with the grid resistor 256. Only the positive voltage spike resulting from the differentiation has any effect on the normally cutoff vacuum triode 234. The positive spike initiates the switching cycle in the multivibrator 232. The leading negative voltage spike from the differentiated negative voltage pulse to the multivibrator 232 has no effect since the triode 214 is already cut off. The position of the tap 255 determines to what level the potential at the plate of the vacuum triode 234 will drop when a positive voltage spike is applied to its control grid. This in turn determines how far the control grid of the vacuum triode 236 is driven negative and beyond cutoff by the charging current for condenser 248 flowing through grid resistor 246. Hence adjusting the potentiometer tap 255 for less negative bias will increase the width of the negative voltage step at the plate of the vacuum triode 234 and therefore will increase the gate pulse width. The maximum permissible gate pulse width is related to the character of waveform to be metered. The steeper the waveform to be metered the narrower the gate pulse width necessary. It is necessary to compromise. From the point of view of accuracy, it is desirable to have a very narrow gating pulse. However, the amount of voltage that can be developed across a meter storage condenser as employed in the circuit decreases as the gate width decreases; hence the narrower the gate width, the greater the sensitivity required of the measuring instrument. Therefore, a compromise may have to be made between gate width and meter sensitivity, depending on the delay times involved in a specific application.

The gate pulse output from multivibrator 232 is coupled to the cathode follower 262 by means of a coupling condenser 269 (.015 mfd.). The cathode follower serves to supply a fast rising negative output gating pulse. The cathode follower 262 includes a vacuum triode 266 (both halves of a 12AT7). The plate of the vacuum triode 266 is connected directly to the power supply 52. A pair of series connected load resistors 268 (150 ohms) and 272 (3300 ohms) are connected between the cathode of vacuum triode 266 and ground. A grid resistor 274 (.1 megohm) is connected between the junction of the series-connected load resistors 268 and 272 and at its other end is connected to the control grid of triode 266 for providing the grid cathode bias. The coupling condenser 269 is connected between the plate of the vacuum triode 234 of multivibrator 232 and the control grid of the vacuum triode 266 of the cathode follower 262. The output of the multivibrator 232 is a negative-going rectangular pulse which acts to cut off the cathode follower triode 266 by driving its control grid beyond cutoff; the result is a fast rising negative-gating pulse at the output.

A coupling condenser 282 (.05 mfd.) in series with a resistor 284 (.5 megohm) is connected between the cathode of the vacuum triode 266 and ground. The time constant of this resistor-capacitor coupling is relatively long so that substantially the entire negative pulse is coupled into a succeeding diode switch. A rectifier 286 (IN38) is connected directly across resistor 284 to prevent any positive overshoots from being coupled into the succeeding diode switch.

A photo-amplifier is connected in circuit with the photomultiplier 44 to provide for proper polarity at the output of the amplifier and also provide for proper linearity and a satisfactory amount of amplification with sufficient bandwidth for the specific application. The amplifier includes vacuum triodes 292 (½12AT7), 294 (½5963), and 296 (½5963). A plate-load resistor 298 (.2 megohm) is connected between the power supply 52 and the plate of the vacuum triode 292. The cathode of the vacuum triode 292 is raised to a fixed bias potential by means of a voltage divider including resistor 302 (.39 megohm) in series with cathode resistor 304 (500 ohms) connected between power supply 52 and ground.

The control grid of the triode 294 is direct-coupled to the plate of the triode 292. A plate-load resistor 306 (40 kilohms) is connected between power supply 52 and triode 294. A cathode bias resistor 308 (20 kilohms) large enough to allow for direct-coupling is connected between the cathode of the vacuum triode 294 and ground. A battery 312 direct couples the plate of the triode 294 to the control grid of triode 296. The triode 296 is connected as a cathode follower. It is connected between power supply 52 and resistor 314 (.2 megohm).

A circuit is provided for checking photoamplifier linearity. The circuit includes a direct current regulated power supply 322 (—150 volts). The positive terminal of power supply 322 is grounded. A pair of voltage dividers is connected directly across the power supply 322. One of the voltage dividers includes in series the resistance winding of a potentiometer 324 (.1 megohm), fixed resistor 326 (2. megohms), and fixed resistors 328, 332, 334 and 336 (145 ohms each). A five position selector switch 338 is connected between the input end of the photoamplifier at the control grid of triode 292 and the voltage taps 340, 342, 344, and 346, respectively, of the voltage divider. One of several values of negative bias may be applied to the control grid of the vacuum triode 292 by the contactor of switch 338 for calibration purposes. When the circuit is in operation the contactor of switch 338 is in "off" position. The potentiometer 324 allows for adjustment for full scale deflection. Another voltage divider is connected across the power supply 322; it includes the resistance portion of a potentiometer 352 (50 kilohms) in series with a fixed resistor 354 (50 kilohms). One end of a cathode resistor 314 is connected to the tap of the potentiometer 352. Potentiometer 352 is used to zero the output of the amplifier.

A vacuum triode 356 (½12AT7) is connected between the plate of the vacuum triode 292 and one terminal of a ganged four-position function switch 358. The delayed gating pulse is applied to the control grid of triode 356 at the junction of coupling condenser 282 and resistor 284. Triode 356 and coupling diode 362 form a modified diode switch. In the absence of a negative gating pulse output at the cathode of the triode 266 the control grid of the triode 356 is at ground potential. With the function switch 358 in the position shown, the vacuum triode 356 is fully conducting. Current flow in vacuum triode 356 causes a large voltage drop across the plate load resistor 298. This low plate potential is passed through the photoamplifier to the cathode of cathode follower 296 and filament of diode connected vacuum triode 362. This makes the potential of the filament of diode 362 more positive than its plate for values of photomultiplier input signal (negative polarity) to the photoamplifier. Hence, diode 362 is non-conducting as long as the gating pulse is absent from the grid triode 356. When the delayed gating pulse arrives after the selected time delay interval after the first synchronizing pulse elapses, the triode 356 is cut off by the negative gate. The triode is therefore effectively out of the circuit and the photo-amplifier functions as a normal amplifier from its input to the output which is developed across storage condenser 374 at the input to electrometer VTVM 372. Since the polarity of the photo input signal from the photo-multiplier is negative, the filament of diode 362 is now more negative than its plate and therefore the storage condenser 374 will charge through coupling diode 362 and coupling condenser 376 to the voltage existing at the output of cathode follower 296 at the time of arrival of the gating pulse. This voltage is proportional to the output from the photomultiplier at this instant and hence proportional to the light output from the screen of the cathode ray tube. After the duration of the gating pulse, the coupling diode 362 becomes non-conducting and isolates the storage condenser 374 with its charge. The electrometer VTVM 372 then indicates the voltage across storage condenser 374.

A direct-current power supply 364 is connected across the heater cathode of the vacuum triode 362. The control grid and plate of the electrometer vacuum triode 362 are joined. An electrometer vacuum tube is a multi-element tube characterized by a grid to cathode resistance on the order of $10^{12}$ ohms and also has an extremely high back resistance when connected as a diode.

The vacuum tube voltmeter 372 shown on the drawings at the output end of the circuit is a modification of a commercial electrometer vacuum tube voltmeter. However, the vacuum tube voltmeter selected for this purpose is not limited to the type shown. The vacuum tube voltmeter used has to have a very high input resistance. A storage condenser 374 (.1 mfd.) is connected across the vacuum tube voltmeter 372. A very small coupling condenser 376 (.005 mfd.) is connected between the plate of the electrometer vacuum triode 362 and the input of the vacuum tube voltmeter 372, so as to allow charging of the storage condenser in the shortest possible time. Both the storage condenser 374 and coupling condenser 376 have low leakage, the amount of which depends upon the specific application.

The electrometer vacuum tube voltmeter 372 included in the block is one of several types of vacuum tube voltmeters which would serve the purpose of recording the voltage across the storage condenser 374. The main requirement of the meter is that it have a high input resistance. The higher the input resistance, the longer the storage condenser will retain its charge and the longer it will take for its charge to be bled off by the vacuum tube voltmeter 372. The detailed circuitry shown within the block has been used in the embodiment of the invention shown and operates satisfactorily.

Figure 4:
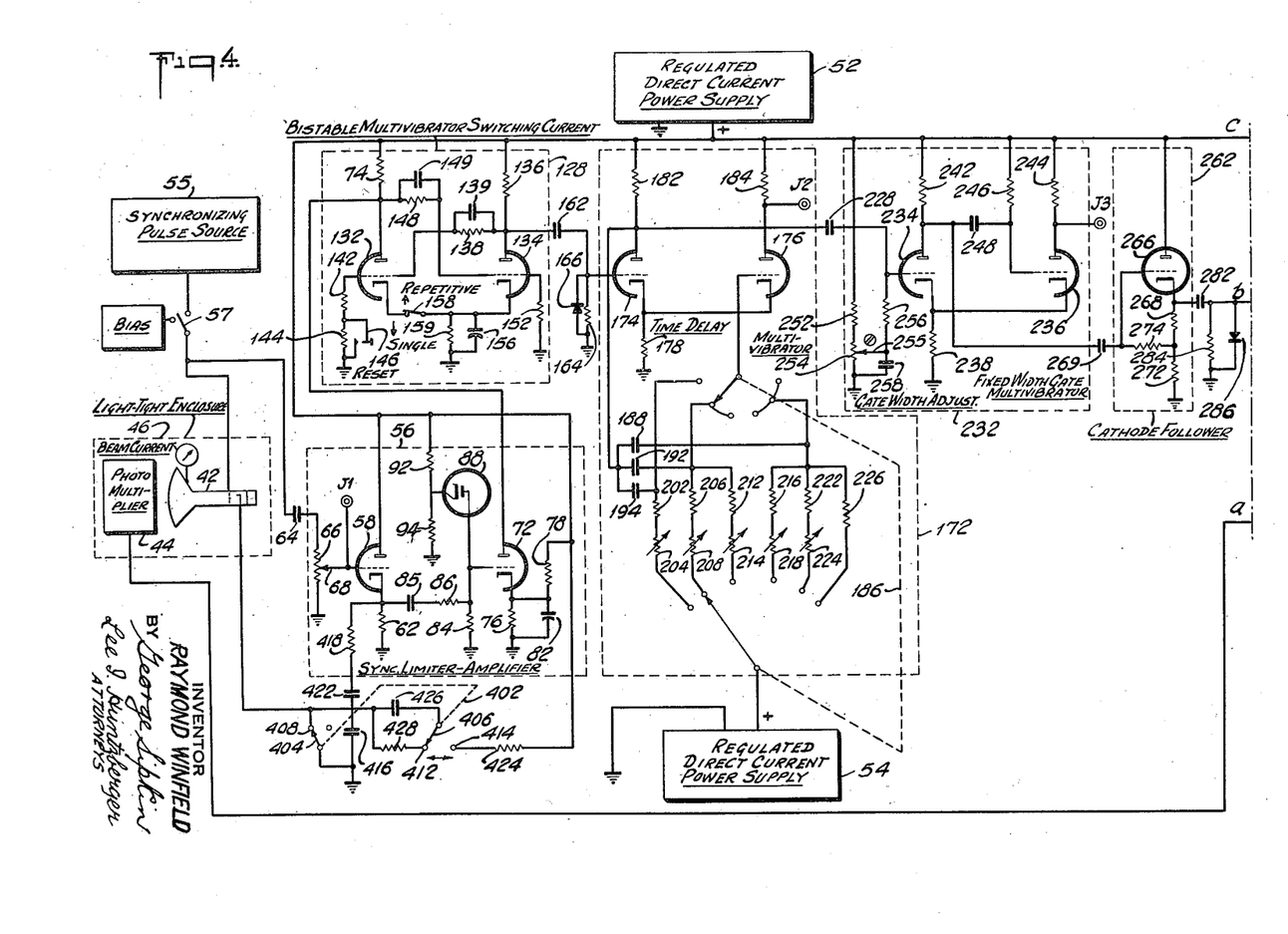

A manual switch 402 is provided for controlling the initiation of another type of screen measurement. The switch 402 is a two-deck ganged switch including switch decks 404 and 406. The switch deck 404 includes a single active terminal 408. The switch deck 406 includes a pair of active terminals 412 and 414. The contactor of switch deck 404 is connected directly to ground. The cathode ray tube 42 in this type of measurement is connected directly to the terminal 408 of the switch deck 404. When the switch 402 is in the position shown in Fig. 4, the cathode of the cathode ray tube 42 is connected directly to ground. A condenser 416 (.001 mfd.) is connected directly between the switch terminal 408 and ground. The cathode of the vacuum triode 58 is coupled to the condenser 416 by means of a resistor 418 (40 kilohms) in series with a condenser 422 (.01 mfd.). A charging circuit branch is provided for the condensers 416 and 422. The charging circuit branch includes a charging resistor 424 (50 kilohms) connected between the power supply 52 and the switch terminal 414. The charging circuit branch further includes a condenser 426 (.1 mfd.) connected between the contactor of the switch deck 406 and the junction between the condensers 416 and 422. The condenser 426 is arranged to be shunted by a discharge resistor 428 (330 kilohms) connected between the terminal 412 of the switch deck 406 and the junction between condensers 416 and 422. The switch 402 is operated in proper relationship with switch 57. When periodic pulsing of the cathode ray tube is used as in the application first described, the switch 57 is closed and the switch 402 is left in the position shown in Fig. 4. However, when it is desired to measure the screen's light output some time after a steady state screen excitation is removed, the switch 57 is opened, the screen of the cathode ray tube 42 is energized with a steady beam current raster for a period of time long enough to permit the screen to reach a constant level of excitation, and then the switch 402 is actuated to its other position, opposite to that shown in Fig. 4, the condensers 416 and 426 are charged, in series, from power supply 52 through the resistor 424. The circuit has a very short time constant whereby the cathode of the cathode ray tube is substantially instantaneously raised to the positive potential high enough for cutting off the cathode ray tube beam current. The voltage developed across the condenser 416 has a steep front; it is differentiated by the condenser 422 in series with the resistor 418. The portion of the positive voltage spike developed across resistor 62 is coupled into the control grid of vacuum triode 72 in the same manner as if the signal had been derived from the synchronizing pulse source 55. Resistor 418 serves as an isolation resistor to prevent the condenser 422 from shunting the cathode resistor 62 when the circuit is being operated with the switch 57 closed. The resistor 428 serves to discharge the condenser 426 after a persistence measurement is made to prevent any voltage from being built up across the condenser 426 in a subsequent persistence measurement.

Figure 5:
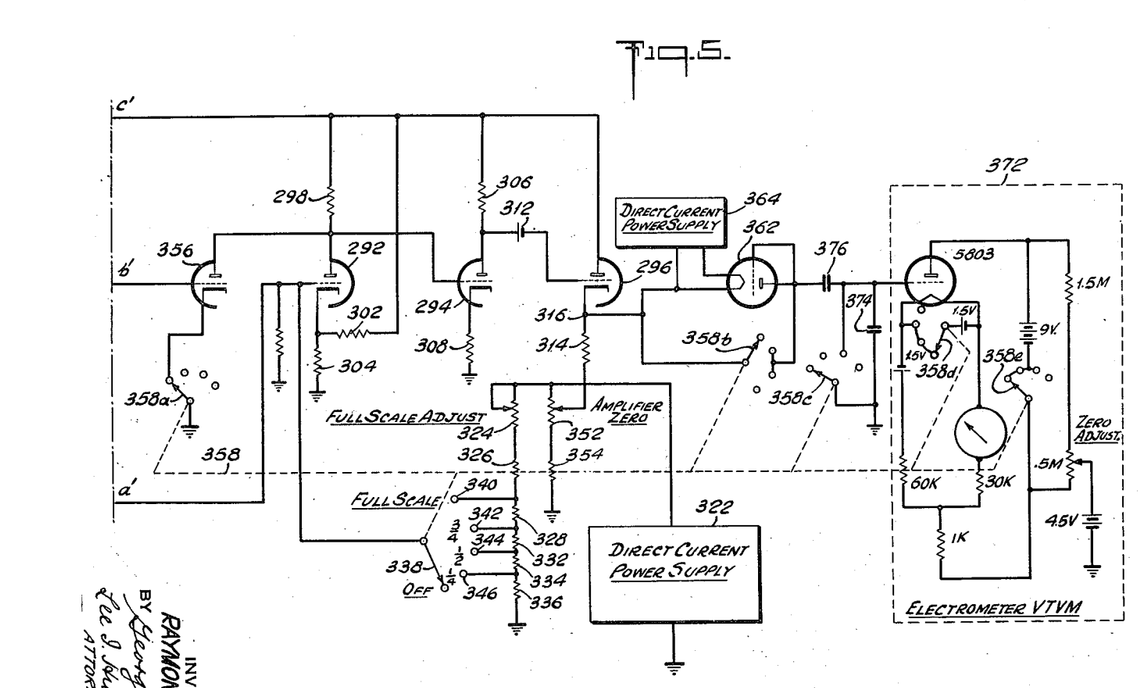
Figure 6:
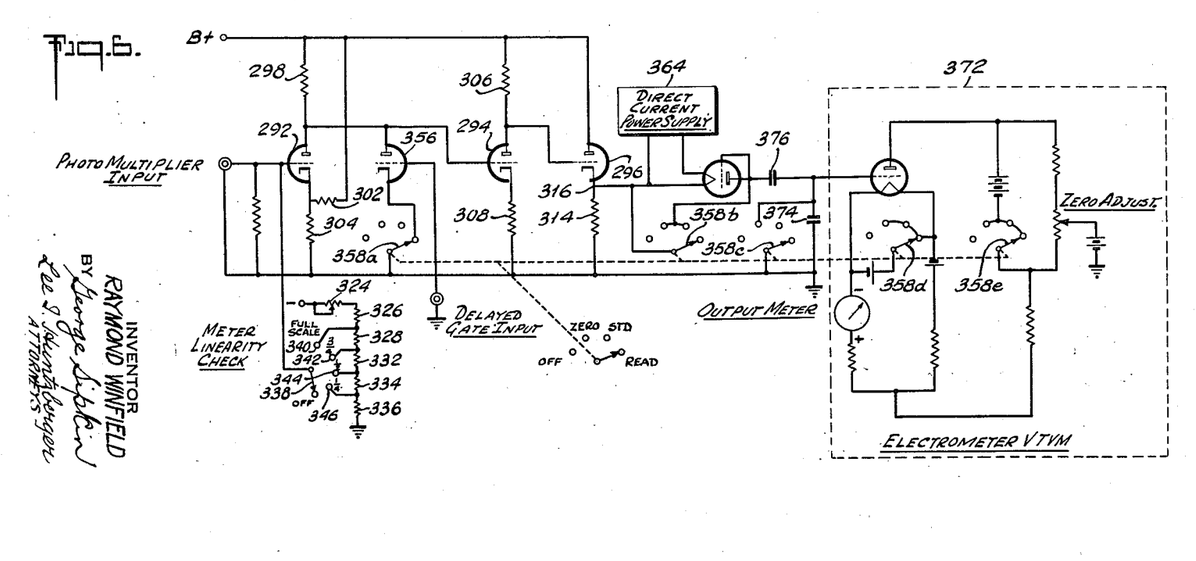
Fig. 6 is a modification of that portion of the composite circuit shown in Fig. 5.

The wiring diagram shown in Fig. 6 is a slight modification over the wiring diagram shown in Fig. 5 and may be interchanged with the portion of the circuit shown in Fig. 5. The elements are generally the same with only slight rearrangement. However, several circuit changes have been made for purposes of simplification and only these are described in detail. In the circuit of Fig. 6 the coupling battery 312 between the plate of the vacuum triode 294 and the control grid of the vacuum triode 296 has been eliminated. In addition, the zero adjustment in the cathode circuit of triode 296 is eliminated. The zero adjustment (Fig. 5) includes the potentiometer 352 and the fixed resistor 354 for reducing the terminal 316 of the photoamplifier to ground potential. The cathode resistor 314 is connected to ground instead of being connected to zero adjustment as in Fig. 5. With the values of the components given in the preceding description used in Fig. 6, the cathode of the triode 296 is raised to approximately 170 volts and the control grid of the triode 276 is connected to the plate of the triode 294. Because of the switching arrangement this is cancelled out along with any drift voltage since the coupling condenser 376 operates at a potential of about 170 volts without the signal. This voltage is placed across condenser 376 when it is shunted across cathode resistor 314 in the zeroing position. No balancing reference voltage is needed. The coupling condenser 376 tends to discharge, however, by a much greater amount through its leakage resistance than in the arrangement of Fig. 5 due to the higher initial voltage across it. This causes a slowly increasing downscale deflection on the galvanometer of the vacuum tube voltmeter 372 since the sum of the voltages across the coupling condenser 376 and the storage condenser 374 must equal the cathode potential of the triode 296. However, if a condenser with lower leakage is used as coupling condenser 376 this is reduced.

The photo-amplifier and electrometer V. T. V. M. may be checked for linearity by means of switch 338. The switch is placed with contactor in contact with terminal 340 in which position potentiometer 324 is adjusted for full scale deflection on the electrometer output meter. The photo-amplifier and electrometer V. T. V. M. is tested for linearity by switching the contactor of switch 338 into electrical continuity with the terminals 342, 344, and 346, respectively. Because each of the associated resistors of the voltage divider are of equal magnitude and are precision resistors, the input to the photo-amplifier is changed by equal amounts (25% of full scale) in switching from one terminal to the next. The deflection of the output meter is noted and deviation from the true reading can be used for correction purposes in the conventional way. Linearity checks are made periodically if warranted.

In operation, the entire circuit of the time-selective meter is first standardized. To accomplish this, all the powers of supply are turned on and the function switch 358 (Fig. 5) is thrown from off to zero position. In this position the storage condenser 374 is short circuited. The electrometer vacuum tube voltmeter 372 is then adjusted so that the galvanometer (output meter) reads zero. After that, the function switch 358 is moved on to the "Standardize" position. With the switch 358 in the "Standardize" position, a standard lamp, which is placed near the photomultiplier 44 in the light-tight housing 46, provides a known source of light intensity for standardizing the deflection of the output meter. The sensitivity of the photomultiplier is then adjusted (adjustment not shown) until the output from the photomultiplier, when passed by the photoamplifier, produces a full scale indication on the output meter. This deflection then corresponds to a known light intensity and standardization is complete. Switch 358 is turned to the "Read" position, the reset button 146 having been previously depressed and the cathode ray tube having been previously adjusted for prescribed operating voltages. The desired time-delay is selected with switch 186 and switch 57 is then closed allowing the train of synchronizing pulses to excite the cathode ray tube grid and at the same time to enter the time selective meter. When function switch 358 is placed in the "Read" position, the cathode circuit of triode 356 is completed so that it can accept the first and only negative gate pulse when it arrives after the selected time interval after the first synchronizing pulse excites the cathode ray tube grid. The storage condenser is charged when the gate pulse cuts off triode 356 for the pulse width time of the gate pulse, and the electrometer V. T. V. M. reads this voltage, giving an indication of the light output from the cathode ray tube at the instant the gating pulse turns on the photo-amplifier. This completes the measurement.

The time delays can be periodically checked for accuracy by means of the monitor jack J2 which is used to observe the time-delay pulse width or by comparison of the delayed gate output pulse with known delayed pulses by means of coincidence circuits. The width of the gate pulse may be observed at monitor jack J3. The pulse is adjusted for the maximum width consistent with a given application, as stated elsewhere in this application, 500 microseconds is chosen. This usually does not have to be changed so long as the type of waveform being metered is substantially the same. In any case, so long as the waveform changes very little during the gating time, the gating process can be considered essentially instantaneous. When checking and adjusting time delays or gate widths, continuous triggering of the circuits is desirable. This is accomplished by converting the bistable multivibrator switch 128 to an amplifier by throwing switch 158 to break the cathode circuit of triode 132.

Obviously many modifications and variations of the present invention are possible in the light of the above teachings. It is therefore to be understood that within the scope of the appended claims the invention may be practiced otherwise than as specifically described.

I claim:

1. A time selective meter circuit for use in ascertaining cathode ray tube screen characteristics, said time selective meter circuit comprising in combination; an extremely high input resistance vacuum tube voltmeter circuit; a low leakage storage condenser connected across the terminals of said voltmeter circuit; a light-tight box adapted for supporting a cathode ray tube; a photomultiplier stage including a photomultiplier mounted in said light-tight box, said photomultiplier stage adapted to generate a voltage which is directly proportional to the light intensity at the screen of a cathode ray tube mounted in said light-tight box; a photoamplifier connected to said photomultiplier stage; a normally nonconducting diode connected in circuit between the output end of said photoamplifier and said storage condenser; a variable delayed gate generating means connected in circuit with said photoamplifier for permitting said diode to conduct at a selected instant so as to permit said storage condenser to charge to the voltage which is directly proportional to the light intensity at that instant at the screen of the cathode ray tube supported in said light-tight box, said variable delayed gate generating means including a synchronizing limiter-amplifier, a bistable multivibrator switching circuit connected to said synchronizing limiter-amplifier for permitting only one trigger pulse to pass a time-delay multivibrator connected to said bistable multivibrator switching circuit for generating a trigger pulse spaced by a predetermined time delay from the pulse generated by said bistable multivibrator switching circuit, a fixed-width gate multivibrator connected to said time-delay multivibrator for generating a gating pulse coincident with the trigger pulse generated by said time-delay multivibrator, and a triode whose control grid is connected in circuit with said fixed-width gate multivibrator for causing said photoamplifier to be isolated from said storage condenser except during the time interval of the gating pulse; and a synchronizing pulse source adapted to pulse and activate synchronously said variable delayed gate generating means and the cathode ray tube in said light-tight box, for changing the bias on the latter for changing its beam current, whereby the light intensity at the cathode ray tube screen is metered at a selected instant following change in the cathode ray tube beam current.

2. A time selective meter as described in claim 1 wherein said synchronizing pulse source generates a continuous series of pulses and said bistable multivibrator switching circuit includes means for converting its operation to that of an amplifier.

3. A time selective meter as described in claim 1 wherein said synchronizing pulse source is constructed and arranged to generate only a single synchronizing pulse.

4. A time selective meter circuit for use in ascertaining cathode ray tube screen characteristics, said time selective meter circuit comprising in combination; a vacuum tube voltmeter; a low leakage storage condenser connected across the terminals of said voltmeter; means adapted to generate a voltage which is directly proportional to the light intensity at the screen of a test cathode ray tube, an amplifier connected to said means; a normally nonconducting diode connected in circuit between the output end of said amplifier and said storage condenser; a variable delayed gate generating means connected in circuit with said amplifier for generating a gating pulse for permitting said diode to conduct at a selected instant so as to permit said storage condenser to charge to the voltage which is directly proportional to the light intensity at that instant at the screen of the test cathode ray tube, said variable delayed gate generating means including a bistable multivibrator switching circuit for permitting only one trigger pulse to pass, a time-delay multivibrator connected to said bistable multivibrator switching circuit for generating a trigger pulse spaced by a predetermined time delay from the pulse generated by said bistable multivibrator switching circuit, a fixed-width gate multivibrator connected to said time-delay multivibrator for generating a gating pulse coincident with the trigger pulse generated by said time-delay multivibrator, and a triode whose control grid is connected in circuit with said fixed-width gate multivibrator for causing said amplifier to be isolated from said storage condenser except during the time interval of the gating pulse; and a synchronizing pulse source adapted to pulse and activate synchronously said variable delayed gate generating means and the test cathode ray tube, for changing the bias on the latter for changing its beam current, whereby the light intensity at the test cathode ray tube screen is metered at a selected instant following change in the cathode ray tube beam current.

5. A time selective meter circuit for use in ascertaining cathode ray tube screen characteristics, said time selective meter circuit comprising in combination; a vacuum tube voltmeter; a low leakage storage condenser connected across the terminals of said voltmeter; means adapted to generate a voltage which is directly proportional to the light intensity at the screen of a test cathode ray tube; an amplifier connected to said means; a normally nonconducting diode connected in circuit between the output end of said amplifier and said storage condenser; a variable delayed gate generating means connected in circuit with said amplifier for generating a gating pulse for permitting said diode to conduct at a selected instant so as to permit said storage condenser to charge to the voltage which is directly proportional to the light intensity at that instant at the screen of the test cathode ray tube, said variable delayed gate generating means including a bistable multivibrator switching circuit for permitting only one trigger pulse to pass, a time-delay multivibrator connected to said bistable multivibrator switching circuit for generating a trigger pulse spaced by a predetermined time delay from the pulse generated by said bistable multivibrator switching circuit, a fixed-width gate multivibrator connected to said time-delay multivibrator for generating a gating pulse coincident with the trigger pulse generated by said time-delay multivibrator, and a synchronizing pulse source adapted to pulse and activate synchronously said variable delayed gate generating means and the test cathode ray tube, for changing the bias on the latter for changing its beam current, whereby the light intensity at the test cathode ray tube screen is metered at a selected instant following change in the cathode ray tube beam current.

6. A variable delayed gate generating means for a time selective meter circuit comprising a pulse shaping amplifier for connection to a source of a synchronizing start pulse to provide an output pulse with a steep leading edge coincident with the synchronizing start pulse, a bistable multivibrator circuit connected to said amplifier and having settable means for setting said multivibrator to a particular one of its two stable operating conditions whereby after said multivibrator is set and it receives a pulse from said amplifier it generates only one trigger pulse whose leading edge is substantially coincident with the leading edge of the pulse from said amplifier and until said multivibrator is reset it generates no other pulse, an adjustable time-delay multivibrator coupled to said bistable multivibrator circuit for generating a trigger pulse spaced by a predetermined time delay from the leading edge of the trigger pulse generated by said bistable multivibrator circuit, and a fixed-width gate multivibrator coupled to said time-delay multivibrator for generating a gating pulse whose leading edge is substantially coincident with the leading edge of a pulse from said time delay multivibrator for rendering the meter circuit operative during the gating pulse.

7. A variable delayed gate generating means for a time selective meter circuit comprising a bistable multivibrator circuit for connection to a source of a synchronizing pulse with a steep leading edge, said multivibrator having settable means for setting said multivibrator to a particular one of its two operating conditions whereby after said multivibrator is set and it receives a synchronizing pulse it generates only one trigger pulse whose leading edge is substantially coincident with the leading edge of the synchronizing pulse and until said multivibrator is reset it generates no other pulse, an adjustable time-delay multivibrator coupled to said bistable multivibrator circuit for generating a trigger pulse spaced by a predetermined time delay from the leading edge of the trigger pulse generated by said bistable multivibrator circuit, and a fixed-width gate multivibrator coupled to said time-delay multivibrator for generating a gating pulse whose leading edge is substantially coincident with the leading edge of a pulse from said time delay multivibrator.

8. A time selective meter circuit for use in measuring the amplitude of a physical parameter at a selected instant following a selected reference time, where the amplitude of the parameter at the reference time is known but changes rapidly thereafter, and where the amplitude of the parameter is translatable instantaneously and continuously into an electric voltage amplitude such that for every parameter amplitude over a particular range, there is a corresponding voltage amplitude and where the reference time at which the parameter changes from a known amplitude can be selected at will, said time selective meter circuit comprising; a very high input impedance voltmeter; a low leakage storage condenser connected across the terminals of said voltmeters; means coupled to said storage condenser for translating the amplitude of said parameter into a corresponding electric voltage amplitude, said translating means including gating means for blocking an output from said translating means to said storage condenser except during a gating pulse input to said gating means; a variable delayed gate generator coupled to said gating means for generating a gating pulse for permitting said storage condenser to be charged by said translating means to a voltage amplitude which corresponds to the amplitude of the parameter at the time of the gating pulse, said variable delayed gate generating means including a bistable multivibrator circuit having settable means for setting said multivibrator to a particular one of its two stable operating conditions whereby after said multivibrator is set and it receives a trigger pulse it generates only one trigger pulse whose leading edge is substantially coincident with the leading edge of the input trigger pulse and until said multivibrator is reset it generates no other pulse; a time delay multivibrator connected to said bistable multivibrator for generating a trigger pulse spaced by a predetermined time delay from the leading edge of the pulse generated by said bistable multivibrator; a fixed width gate multivibrator connected to said time delay multivibrator for generating a gating pulse whose leading edge is substantially coincident with the leading edge of a pulse from said time delay multivibrator; and means to initiate change in the parameter from a known amplitude at a selected reference time and to simultaneously generate a trigger pulse for said bistable multivibrator.

9. A time selective meter circuit for use in measuring the amplitude of a physical parameter at a selected instant following a selected reference time, where the amplitude of the parameter at the reference time is known but changes rapidly thereafter and where the amplitude of the parameter is translatable instantaneously and continuously into an electric voltage amplitude such that for every parameter amplitude over a particular range, there is a corresponding voltage amplitude, and where the reference time at which the parameter changes from a known amplitude can be selected at will, said time selective meter circuit comprising; a very high input impedance voltmeter; a low leakage storage condenser connected across the terminals of said voltmeter; means coupled to said storage condenser for translating the amplitude of said parameter into a corresponding electric voltage amplitude, said translating means including gating means for blocking an output from said translating means to said storage condenser except during a gating pulse input to said gating means; a variable delayed gate generator coupled to said gating means for generating a gating pulse for permitting said storage condenser to be charged by said translating means to a voltage amplitude which corresponds to the amplitude of the parameter at the time of the gating pulse, said variable delayed gate generating means including resettable means for generating only one trigger pulse after a reset in response to an input trigger pulse; the leading edge of the generated trigger pulse being substantially coincident with the leading edge of the input trigger pulse; means coupled to said last-mentioned means for generating a gating pulse spaced by a predetermined time delay from the leading edge of the trigger pulse from said last-mentioned means; a fixed width gate pulse generating means coupled to said last-mentioned means for generating a gating pulse whose leading edge is substantially coincident with the leading edge of a pulse from said last-mentioned means; and means to initiate change in the parameter from a known amplitude at a selected reference time and to simultaneously generate a trigger pulse for said resettable means.

References Cited in the file of this patent

UNITED STATES PATENTS

| | | |
|---|---|---|
| 2,460,471 | Schade | Feb. 1, 1949 |
| 2,576,257 | Lange | Nov. 27, 1951 |
| 2,591,738 | Spencer | Apr. 8, 1952 |
| 2,752,593 | Downs | June 26, 1956 |